United States Patent
Claessen

(10) Patent No.: US 9,342,717 B2
(45) Date of Patent: May 17, 2016

(54) TAMPER DETECTION SYSTEM AND METHOD

(71) Applicant: NCR Corporation, Duluth, GA (US)

(72) Inventor: Albert M. G. Claessen, Oakwood, GA (US)

(73) Assignee: NCR Corporation, Duluth, GA (US)

(*) Notice: Subject to any disclaimer, the term of this patent is extended or adjusted under 35 U.S.C. 154(b) by 67 days.

(21) Appl. No.: 14/190,896

(22) Filed: Feb. 26, 2014

(65) Prior Publication Data

US 2015/0242662 A1  Aug. 27, 2015

(51) Int. Cl.
*G08B 21/00* (2006.01)
*G06K 7/10* (2006.01)
*G08B 13/24* (2006.01)

(52) U.S. Cl.
CPC ........ *G06K 7/10267* (2013.01); *G08B 13/2454* (2013.01)

(58) Field of Classification Search
CPC ................................. G08B 17/00; G08B 21/00

USPC ........... 340/658, 657, 660, 584, 572.1–572.4; 235/379, 380, 382, 492

See application file for complete search history.

(56) References Cited

U.S. PATENT DOCUMENTS

| 6,367,695 B1* | 4/2002 | Mair | G07F 19/20 235/379 |
|---|---|---|---|
| 6,927,687 B2* | 8/2005 | Carrender | 340/539.26 |
| 7,284,692 B1* | 10/2007 | Douglass | 235/379 |
| 8,220,706 B1* | 7/2012 | Miller et al. | 235/379 |
| 8,797,144 B2* | 8/2014 | Hinman | G06K 7/10267 340/10.1 |
| 2012/0038775 A1* | 2/2012 | Priesterjahn | G07F 19/207 348/150 |

* cited by examiner

*Primary Examiner* — Tai T Nguyen
(74) *Attorney, Agent, or Firm* — Paul W. Martin; Schwegman, Lundberg & Woessner

(57) ABSTRACT

A tamper detection system and method which uses a reader and one or more tags to detect tampering near a card reader slot or any other device subject to tampering. An example tamper detection method includes transmitting a signal to a tag adjacent a device susceptible to tampering, and setting an alarm condition when no reply signal or an incorrect reply signal is received in response to the signal.

15 Claims, 4 Drawing Sheets

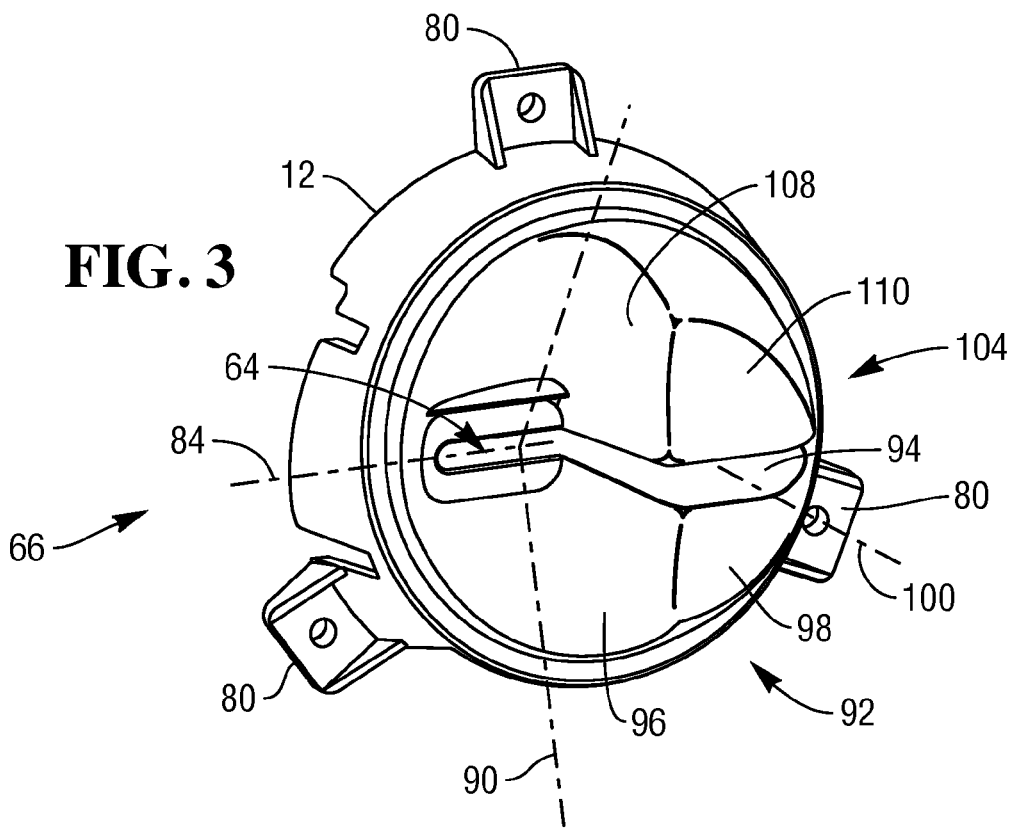
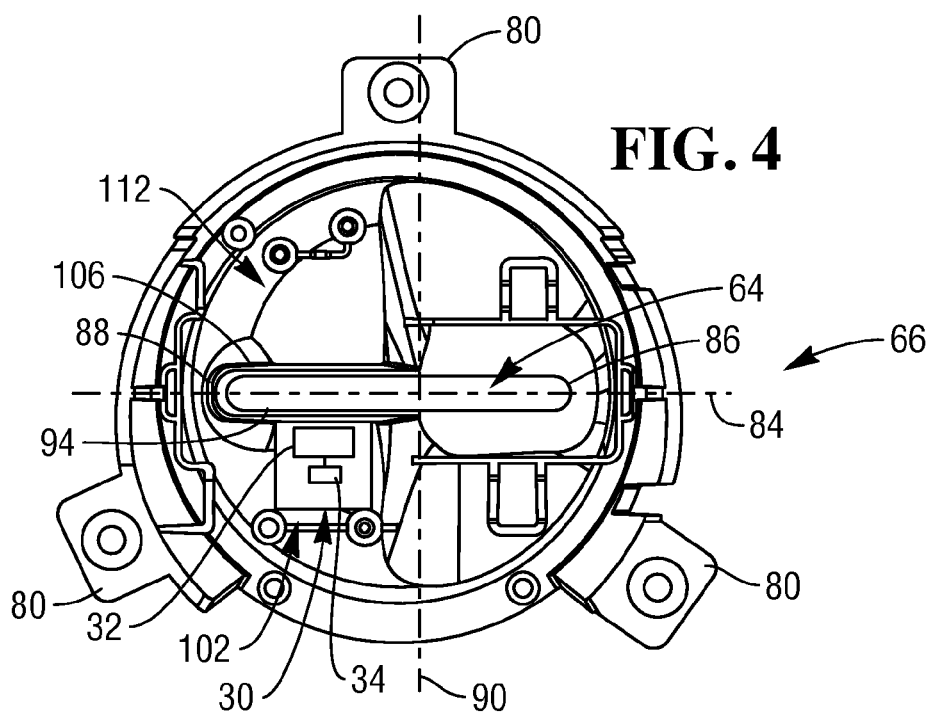

TAMPER DETECTION SYSTEM AND METHOD

BACKGROUND

This present invention relates to magnetic stripe readers (MSRs) and more specifically to a tamper detection system and method.

Unauthorized reading of card data, such as data encoded on a magnetic stripe card, while the card is being used (hereafter "card skimming"), is a known type of fraud. Card skimming is typically perpetrated by adding a magnetic read head to a fascia of an automated teller machine (ATM), fuel pump, or other terminal, to read a magnetic stripe on a customer's card as the customer inserts or (more commonly) retrieves the card from a card reader. The fraudster can then create a new card using the card data read by the alien reader.

If the card is a credit card, the fraudster can begin charging purchases to the customer's credit card account. In the case of debit cards, the fraudster must have the customer's personal identification number (PIN). Several techniques may be used by fraudsters to obtain personal identification numbers (PINs) in order to gain access to customer accounts. Fraudsters can use cameras to capture images of a PIN-entry keypad during customer use. Fraudsters can employ a false overlay to the PIN-entry keypad to record entry of the PIN as it is typed. Finally, fraudsters may watch customers ("shoulder surfing") as the customers enter their PINs. A fraudster can then use the new card and the PIN to withdraw funds from the customer's bank account.

Some installations use preventive measures, such as capacitive sensing devices to detect skimmers. However, capacitive sensing devices are affected by the presence of rain drops and the human hand.

Therefore, a more robust and reliable technique is needed to detect the presence of non-native hardware in the vicinity of a card reader or other device subject to tampering.

SUMMARY

In accordance with the teachings of the present invention, a tamper detection system and method is provided.

An example tamper detection method includes transmitting a signal to a tag adjacent a device susceptible to tampering, and setting an alarm condition when no reply signal or an incorrect reply signal is received in response to the signal.

When a reply signal is received, the example tamper detection method determines frequency response data from the reply signal, compares the frequency response data to reference frequency response data, and sets the alarm condition when the frequency response data does not match the reference frequency response data.

An example tamper detection system includes a tag adjacent to a device susceptible to tampering, and a reader for transmitting a signal to the tag and for setting an alarm condition when the reader fail to receive a reply signal from the tag or fails to receive a correct reply signal from the tag. When the reader receives the reply signal, the reader determines frequency response data from the reply signal, compares the frequency response data to reference frequency response data, and sets the alarm condition when the frequency response data does not match the reference frequency response data.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

FIG. 3 is a front perspective view of a card reader guide cover of the card reader of FIG. 2.

FIG. 4 is a rear perspective view of the card reader guide cover of FIG. 3.

DETAILED DESCRIPTION

Figure 1:
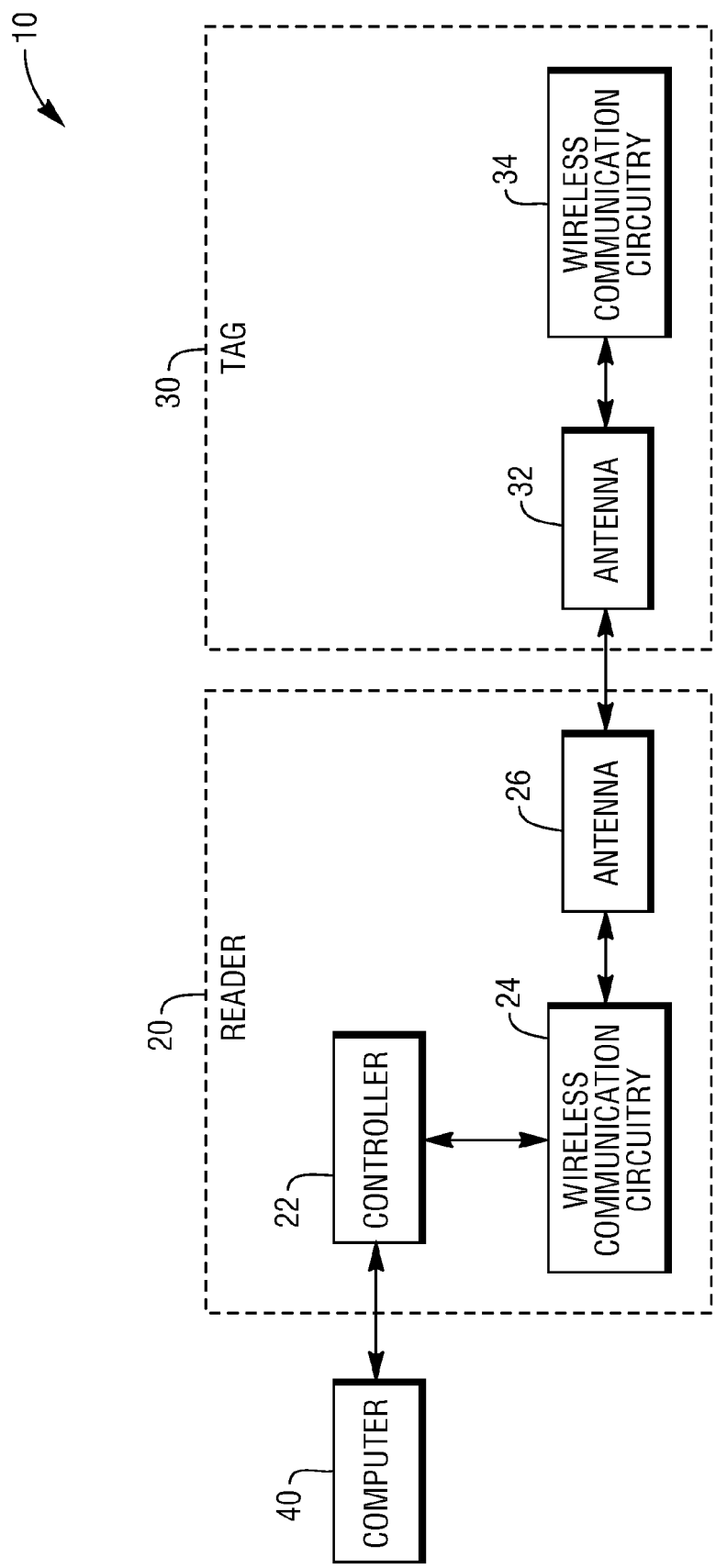
FIG. 1 is a block diagram of an example tamper detection system.

Turning now to FIG. 1, an example tamper detection system 10 uses reader 20 and tag 30 to detect tampering near any device subject to tampering. An example use of system 10 is to detect tampering of enclosures for secure devices, like payment card readers.

Tag 30 includes wireless communication circuitry 34 and antenna 34. Wireless communication circuitry 34 stores a unique tag identifier. In one example embodiment, the tag identifier is an identification bit pattern.

Tag 30 is powered by a signal from reader 20 and responds when interrogated by sending a modulated reply signal. In one example embodiment, tag 30 receives a continuous wave signal from reader 20 and reflects the continuous wave signal back to reader 20 using a technique known as backscattering. Wireless communication circuitry 34 uses the unique tag identifier to modulate the incoming continuous wave signal and produce the modulated reply signal. Thus, tag 30 produces a unique reply signal containing its own tag identifier. For added security, the tag identifier stored by tag 30 may be encrypted for later decryption by reader 20 or computer 40.

Tag 30 may be passive, relying on the energy of the continuous wave signal from reader 20 for powering wireless communication circuitry 34. Alternatively, tag 30 may be active, relying on a local power source, such as a battery, or power from computer 40.

Tag 30 may be installed at various locations and ways in the vicinity of the card reader slot. In one example embodiment, tag 30 is affixed to a card reader guide cover which acts as a fraudulent device inhibitor (FDI). Antenna 32 may be affixed or embedded into the card reader guide cover. Since card reader guide covers are typically made of plastic, antenna 32 may be integrated into the plastic of the card reader guide cover with a technique similar to IMD (In Mold Decoration) or may be printed directly on the plastic with conductive ink. The number and locations of tags 30 and the sensitivity of reader 20 determine the coverage area.

In another example embodiment, tags 30 may be positioned in a fascia of an ATM, fuel pump, kiosk, or other terminal to detect attempts to install a camera or a keypad overlay to capture pin entry.

Antenna 34 may include a segmented square loop antenna, which results in a high sensitivity to a skimmer brought closer than one and half wavelength. Other antenna types are also envisioned.

Reader 20 sends out interrogation signals and receives reply signals from tag 30. For this purpose, reader 20 includes wireless communication circuitry 24 and antenna 26.

Wireless communication circuitry 24 transmits short-range, low power continuous wave signals. Wireless communication circuitry 24 demodulates reply signals from tag 30 and may additionally determine frequency response data, including amplitude and/or phase differences between reader and tag signals.

In one example embodiment, wireless communication circuitry 24 produces continuous wave signals in the microwave band. At a target frequency of 5.8 GHz or higher and a quarter wavelength in size results in antenna 26 being about 13 millimeters or smaller. Use of 5.8 GHz also facilitates very small tag designs compared to radio frequency identification (RFID) tags. Thus antenna 26 may be easily located near the card reader slot. A further advantage of using one of these frequencies is that any rain that enters the card reader slot has little effect on communications between reader 20 and tags 30, since the dielectric constant of water at microwave frequencies is low.

Reader 20 further includes controller 22 which controls operation of wireless communication circuitry 24 and analyzes a reply signal from tag 30. Controller 22 includes a processor, memory, and program and data storage. Controller 22 executes software for obtaining the tag identifier from the reply signal and comparing a received tag identifier to a reference tag identifier to ensure that tag 30 is operational and has not been tampered with, damaged or removed. If the tag identifier is encrypted, controller 22 decrypts the information stored within tag 30 before comparing in order to more easily detect attempts to copy or replace tag 30. When tag 30 is affixed to or embedded into a card reader guide cover, the comparison also determines whether the card reader guide cover has been moved, replaced or otherwise tampered with. When no reply signal is received or incorrect or no data is received, reader 20 sets an alarm condition. Reader 20 may send an alarm message to computer 40 in response to the alarm condition.

Any foreign object close to the transmission and response paths between antenna 26 and tag 30 will change the response signal. Thus, for each tag 30, controller 22 also determines response data (e.g., signal magnitude and phase) from each reply signal and compares received response data to reference response data stored with tag identifiers to ensure that no foreign objects have been inserted close to the transmission and response paths. When no reply signal is received or incorrect or no data is received, reader 20 sets an alarm condition. Reader 20 may send an alarm message to computer 40 in response to the alarm condition.

Insertion of cards and operation of proximate devices, such as a card reader and printer, also change the response signal. Therefore, controller 22 takes measurements when the card reader, printer, and other devices are not in use and the system is in a quiet state.

Reader 20 and/or computer 40 may store reference tag identifiers and reference tag frequency response data. In one example embodiment, computer 40 stores the reference tag identifiers and reference tag frequency response data and reader 20 obtains the data from computer 40 for comparison. The reference data may be captured and stored following installation of reader 20 and tag 30.

Computer 40 may include an ATM, fuel pump, or other terminal in which reader 20 is installed. Alternatively, computer 40 may include a network server which receives communications directly from reader 20 or through an intermediary computer, such as an ATM, fuel pump, or other terminal in which reader 20 is installed.

Computer 40 includes one or more processors, memory, and program and data storage and is configured to execute software necessary to its purpose. Computer 40 further includes circuitry for connecting to corresponding circuitry in reader 20. For example, computer 50 may include network circuitry, Universal Serial Bus (USB) circuitry and/or Bluetooth standard circuitry.

Computer 40 and reader 20 may be configured to encrypt communication between them. This prevents fraudsters from interpreting communications from reader 20 and from spoofing computer 40 into accepting false tag data from a reader 20 that has been tampered with.

Figure 2:
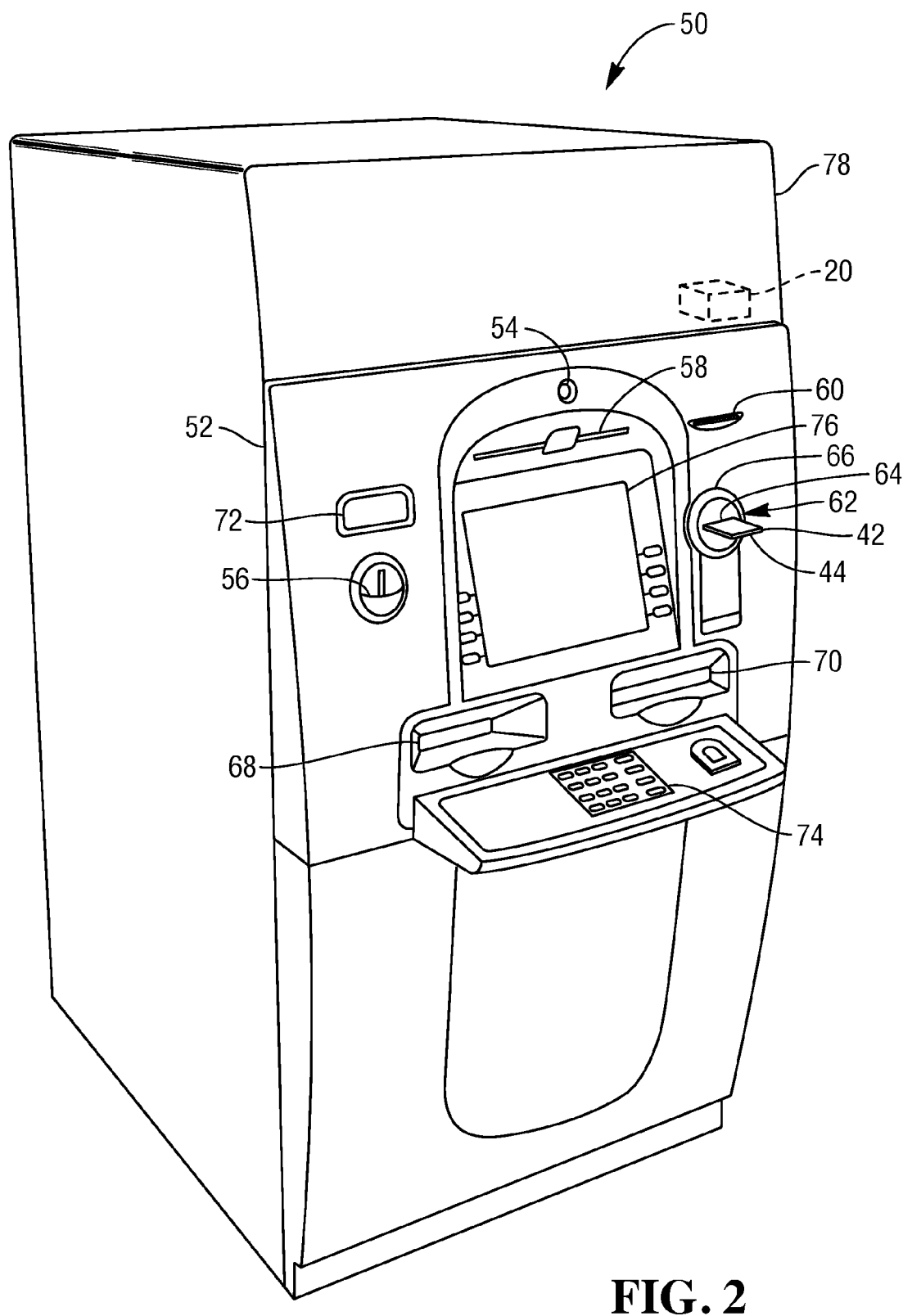
FIG. 2 is a Self-Service Terminal (SST) in the form of an Automated Teller Machine (ATM) with a card reader that is subject to tampering.

With reference to FIG. 2, an example computer 40 in the form of an automated teller machine (ATM) 50 is illustrated. ATM 50 includes a fascia 52 attached to a chassis 78. Fascia 52 provides a user interface for allowing an ATM customer to execute a transaction.

Fascia 52 defines an aperture 54 through which a camera images a customer of the ATM 100. Fascia 52 also defines a number of slots for receiving and dispensing media items and a tray 56 into which coins can be dispensed. The slots include a statement output slot 58, a receipt slot 60, a card reader 62 with a card reader slot 64 defined by card reader guide cover 66, a cash dispense slot 68, a cash and check deposit slot 70 and a branding badge 72. The slots and tray are arranged such that the slots and tray align with corresponding ATM modules mounted within the chassis of the ATM.

The fascia 52 includes an encrypting keyboard 74 for allowing an ATM customer to enter transaction details. A display 76 is provided for presenting transaction screens to an ATM customer.

Reader 20 is located within chassis 78. In one example configuration, reader 20 is located above card reader 62.

Reference will now also be made to FIGS. 3 and 4, which are front and rear perspective views, respectively, of example card reader guide cover 66. Card reader guide cover 66 comprises a molded plastics part dimensioned to be accommodated within, and partially protrude through, an aperture in a fascia 52.

An example card reader guide cover 66 includes a molded plastics part dimensioned to be accommodated within, and partially protrude through, an aperture in fascia 52. Card reader guide cover 66 includes three apertured tabs 80 by which card reader guide cover 66 is coupled to a rear surface of fascia 52.

Card reader slot 64 extends generally horizontally across card reader guide cover 66 in the direction of centre line 84, from one end 86 to another end 88.

Some card readers require orientation of magnetic stripe cards before insertion. In other card readers, the magnetic stripe may be oriented to the one end 86 or the other end 88. In this example embodiment, a customer must insert a magnetic stripe card with the magnetic stripe facing down and adjacent other end 88.

Card reader guide cover 66 defines a breakout line 90 extending generally vertically (perpendicular to card reader slot 64). Card reader guide cover 66 also defines a first (lower) protrusion 92.

The first (lower) protrusion 92 includes a planar section 94 across which the magnetic stripe side of a card passes as the card is inserted. The first (lower) protrusion 92 also includes an upright section 96 that extends from the breakout line 90 to an end surface 98. End surface 98 is spaced from the card slot 64 to ensure that card does not protrude beyond end surface 98 when ejected by card reader 62.

A magnetic stripe path 100 is defined on planar section 94. This is the portion of the planar section 94 that the magnetic stripe on a correctly inserted card will be in registration with when the card is inserted or removed by a customer. In this embodiment, the magnetic stripe path 100 is centered on track two of a magnetic stripe. It is track two that carries the customer account information, so track two is the track that alien readers attempt to read.

The first protrusion 92 also defines a cavity (best seen in FIG. 4 and shown generally by arrow 102), which is beneath planar section 94 and within card reader guide cover 66.

Card reader guide cover 66 defines a second (upper) protrusion 104 similar to, aligned with, and opposite the first protrusion 92.

The second (upper) protrusion 104 includes a planar section 106 (best seen in FIG. 4) beneath which a magnetic stripe side of a card passes as the card is inserted. The second (upper) protrusion 104 also includes an upright section 108 that extends from the breakout line 90 to an end surface 110. The second protrusion 104 defines a cavity 112 above planar section 106.

Other card reader guide cover shapes and configurations are also envisioned.

Referring to FIG. 4, an example configuration includes tag 30 installed in cavity 102. Tag is positioned so that the reply signal can be detected without a lot of noise. As the distance between reader 20 and tag 30 increases, other factors like antenna polarization, should be considered.

In addition to tag 30, other safeguards may also be installed within card reader guide cover 66, such as a capacitive sensor.

Tags 30 may also be positioned in fascia 52 to detect attempts to install a camera or a keypad overlay to capture pin entry.

Figure 5:
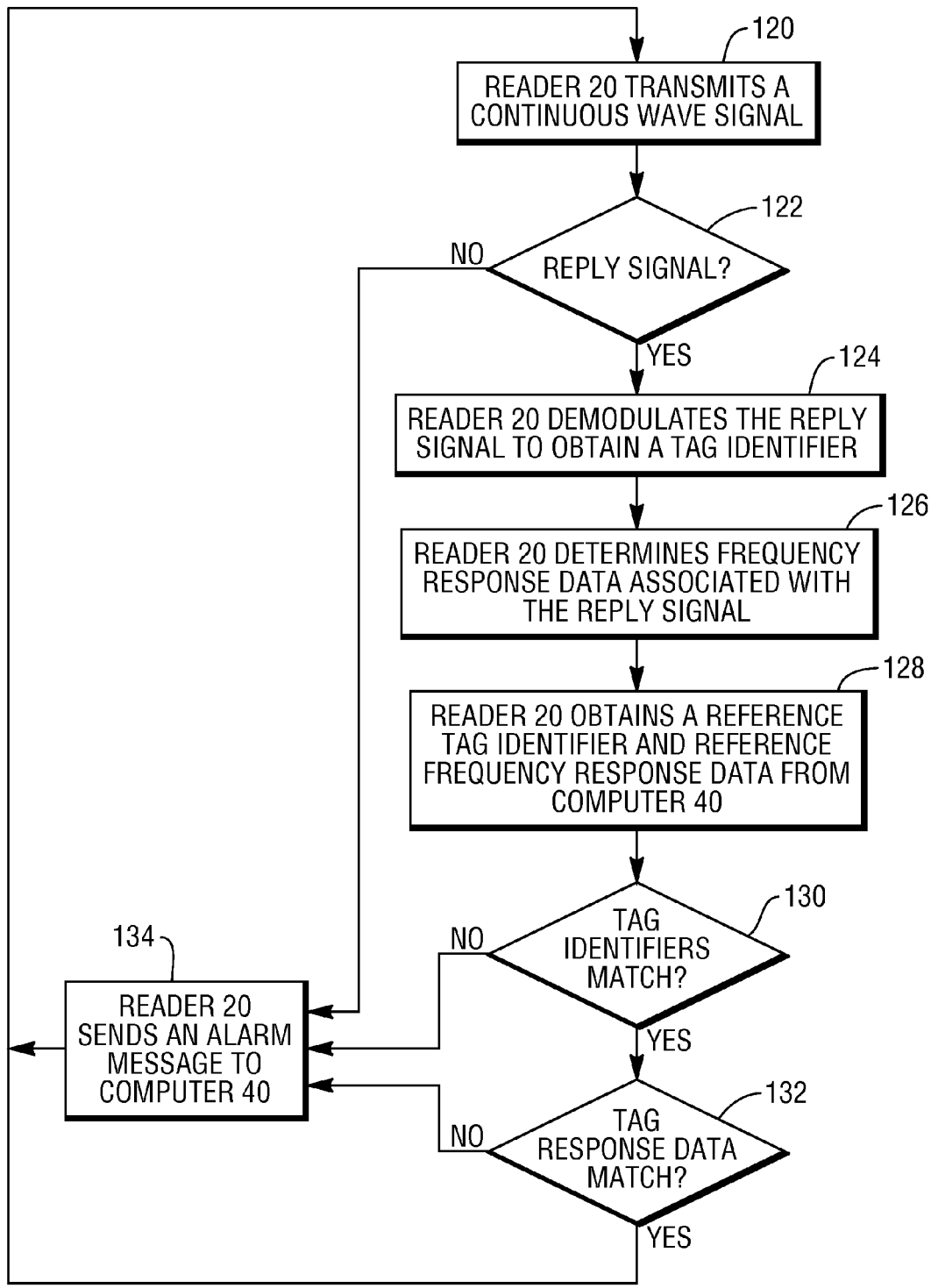
FIG. 5 is a flow diagram illustrating an example tamper detection method.

Referring now to FIG. 5, an example tamper detection method begins with step 120, in which reader 20 transmits a continuous wave signal.

In step 122, if reader 20 fails to receive a reply signal, operation proceeds to step 134. Otherwise, operation continues to step 124.

In step 124, reader 20 demodulates the reply signal to obtain a tag identifier. If the tag identifier is encrypted, reader 20 additionally decrypts the received data to obtain the tag identifier.

In step 126, reader 20 determines frequency response data associated with the reply signal, including signal magnitude and phase.

In step 128, reader 20 obtains a reference tag identifier and reference frequency response data from computer 40.

In step 130, reader 20 compares the tag identifier from the reply signal with a reference tag identifier. If the comparison is true, operation continues to step 132. Otherwise, operation continues to step 134.

In step 132, reader 20 compares the frequency response data to reference frequency response data. If the comparison is true, operation returns to step 120. Otherwise, operation continues to step 134.

In step 134, reader 20 sends an alarm message to computer 40 in response to the alarm condition. Operation returns to step 120 to continue monitoring.

A service organization responsible for monitoring operation of the device may remove the device from service and dispatch a technician to examine the device. When computer 40 contains the device, the service organization may remove computer 40 from service.

Tamper detection system 10 may be used to provide intrusion detection for devices like secure computing devices and safes against enclosure opening and mechanical attacks, like drilling. Tamper detection system 10 may also be used to protect objects from theft and may be used to locate objects near tag 30. Tamper detection system 10 may further be used to provide product information from a tag 30 for system integrity checks (authentic components present).

Although the present invention has been described with particular reference to certain preferred embodiments thereof, variations and modifications of the present invention can be effected within the spirit and scope of the following claims.

What is claimed is:

1. A tamper detection method comprising:
   transmitting a signal to a tag that is molded into a fascia of a terminal, the terminal including an integrated device susceptible to tampering;
   receiving a reply signal from the tag;
   determining frequency response data from the reply signal;
   comparing the frequency response data to reference frequency response data; and
   setting an alarm condition when the frequency response data does not match the reference frequency response data.

2. The method of claim 1, wherein the signal is a continuous wave signal.

3. The method of claim 2, wherein the continuous wave signal has a microwave frequency.

4. The method of claim 1, wherein the frequency response data comprises amplitude differences between the signal and the reply signal.

5. The method of claim 1, wherein the frequency response data comprises phase differences between the signal and the reply signal.

6. The method of claim 1, further comprising:
   determining a tag identifier from the reply signal;
   comparing the tag identifier to a reference tag identifier; and
   setting the alarm condition when the tag identifier does not match the reference tag identifier.

7. The method of claim 6, wherein the determining step comprises:
   demodulating the reply signal.

8. The method of claim 7, wherein the determining step further comprises:
   decrypting the reply signal.

9. A tamper detection system comprising:
   a tag molded into a fascia of a terminal, wherein the terminal includes an integrated device susceptible to tampering;
   a reader for transmitting a signal to the tag and for setting an alarm condition when the reader fail to receive a reply signal from the tag or fails to receive a correct reply signal from the tag,
   wherein the reader, when the reader receives the reply signal, determines frequency response data from the reply signal, compares the frequency response data to reference frequency response data, and sets the alarm condition when the frequency response data does not match the reference frequency response data.

10. The system of claim 9, wherein the signal is a continuous wave signal.

11. The system of claim 9, wherein the frequency response data comprises amplitude and/or phase differences between the signal and the reply signal.

12. The system of claim 9, wherein the reader also determines a tag identifier from the reply signal, compares the tag identifier to a reference tag identifier, and sets the alarm condition when the tag identifier does not match the reference tag identifier.

13. The system of claim 12, wherein the determining step comprises:
   demodulating the reply signal.

14. The system of claim 9, wherein the device susceptible to tampering comprises a magnetic stripe reader.

15. The system of claim 14, wherein the tag is located in a cover of the magnetic stripe reader.

* * * * *